INVENTORS
John B. Brennan,
John B. Force,
Eugene C. McMurray,
BY Henry H. Harada &
John A. McDougal

ATTORNEY

May 7, 1963 J. B. BRENNAN ETAL 3,088,538
VEHICLE SPEED WARNING AND CRUISE CONTROL SYSTEM
Filed Nov. 7, 1960 6 Sheets-Sheet 4

INVENTORS
John B. Brennan,
John B. Force,
Eugene C. McMurray,
BY Henry H. Harada &
John A. McDougal

ATTORNEY

United States Patent Office 3,088,538
Patented May 7, 1963

3,088,538
VEHICLE SPEED WARNING AND CRUISE
CONTROL SYSTEM
John B. Brennan, Flint, John B. Force, Bancroft, Eugene C. McMurray and John A. McDougal, Flint, and Henry H. Harada, Grand Blanc, Mich., assignors to General Motors Corporation, Detroit, Mich., a corporation of Delaware
Filed Nov. 7, 1960, Ser. No. 67,820
3 Claims. (Cl. 180—82.1)

The invention relates to a control mechanism for an automotive vehicle and particularly to a mechanism which provides a warning to the vehicle operator when a predetermined vehicle speed is reached in one mode of operation, and in another mode of operation maintains the vehicle at a predetermined road speed under varying load conditions. Devices of this nature are sometimes referred to as vehicle cruise controls and several devices of this nature have been offered at various times in the automotive accessory market. It is desirable in such devices to have accurate speed control safety features tied in with the vehicle brake system and possibly other vehicle systems such as the ignition system and transmission system. It is preferable that initial operation of a device of this nature be almost instinctive from the standpoint of prevailing driving habits, and that when in the cruise mode of operation it be quickly and completely disengaged by an instinctive drive operation such as application of the vehicle brakes. It should be convenient for the vehicle operator to actuate and adjust to set the desired speed.

In order to accomplish these objectives the system now proposed adds two controls for driver operation. The first control consists of a knob having a pointer indicator and graduated speed scale so that the operator may set the desired vehicle road speed at which he desires to be warned of the attainment of that speed or at which he desires the vehicle to cruise under control of the device. The second control is a push button which is utilized to actuate the cruise control mode of operation so that the device will maintain the set vehicle road speed. The device also is connected with the vehicle brake system so that the cruise mode is disengaged by slight movement of the vehicle brake pedal.

The device embodying the invention utilizes the engine intake manifold pressure, commonly referred to as engine vacuum, as a source of fluid energy to control and actuate the power portion of the system. The system uses an error detector or speed transducer having two input values. One input is the set or command speed which the driver adjusts on the set knob. The other input to the speed transducer is vehicle speed. The speed transducer compares actual speed to the set or command speed and determines the difference between the two to provide an error signal. This signal is sent to an amplifier, the output of which is used to control the fluid pressure servomotor which is in turn connected to control the engine of the vehicle in such a sense as to reduce the error signal to zero and to maintain it as close to zero as possible. The continuous sensing of vehicle speed and the provision of a continuous error signal system keep the error signal very close to zero so that the vehicle travels at almost exactly the set or command speed.

In order to obtain a full understanding of the system components and their functional relation, the system as illustrated in FIGURES 1 through 7 of the drawings is first described after which the operational background of the system will be provided.

Figure 1:
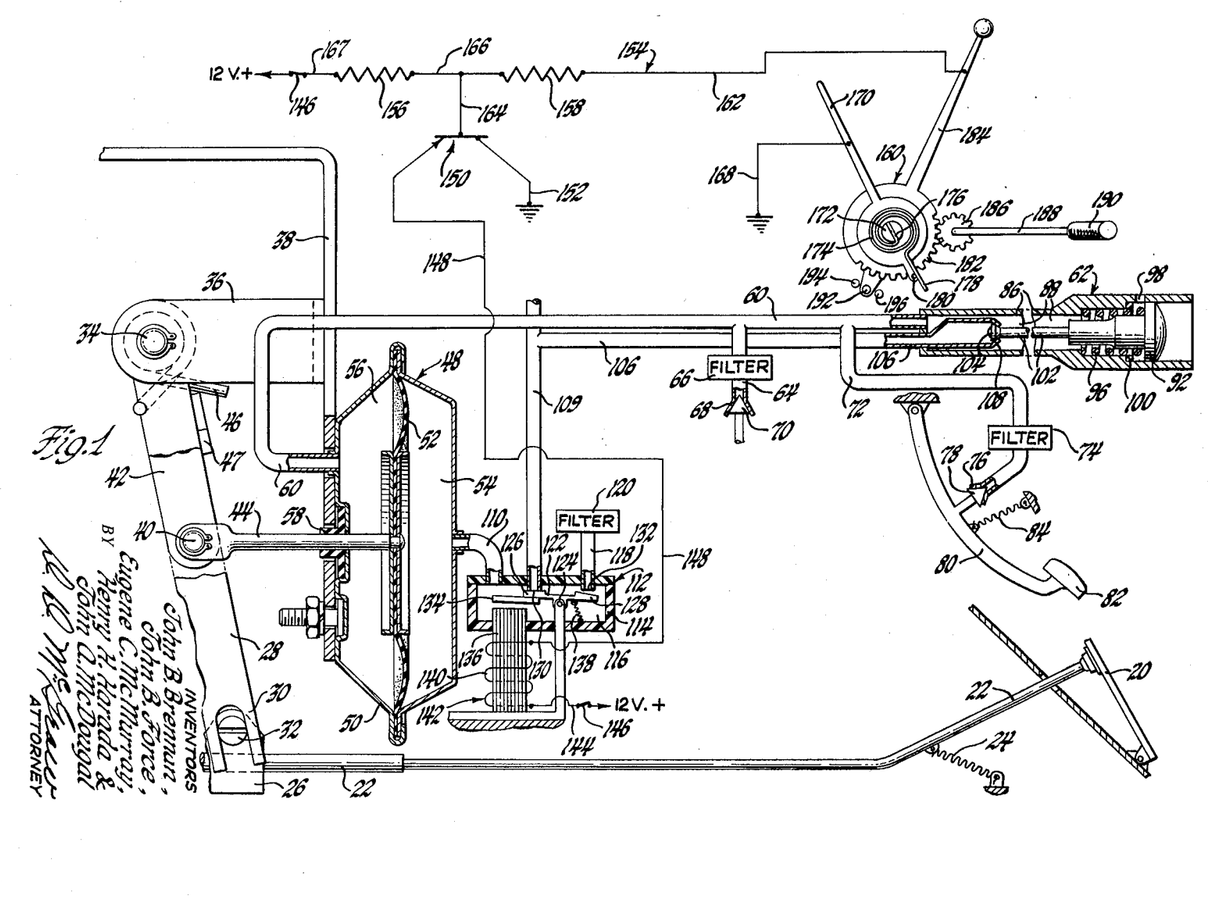
FIGURE 1 is a schematic diagram of a system embodying the invention and showing elements thereof broken away and in section. The system is in the speed warning mode of operation.
Figure 6:
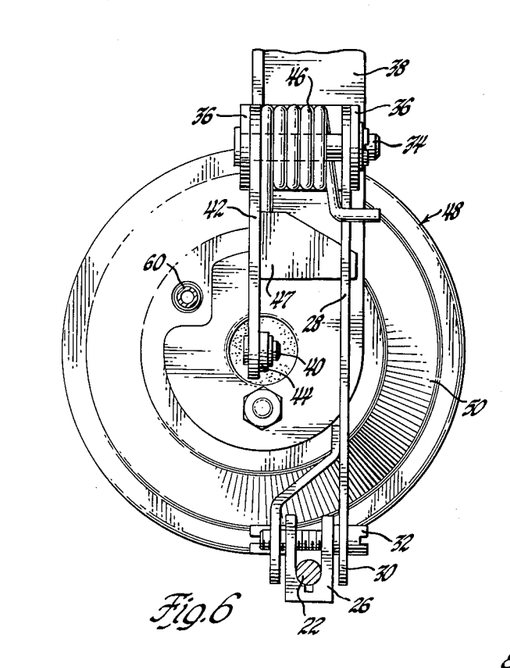
FIGURE 6 is an end view of the servo motor and override control linkage of the system of FIGURE 1 with parts broken away and in section.

The speed control system is illustrated in FIGURE 1 in the condition of operation wherein the vehicle is traveling at a road speed below the cruise-set speed. The usual accelerator pedal 20 is connected to a throttle rod 22 for control of an engine throttle in the well known manner. A throttle return spring 24 is suitably attached to the throttle linkage of which rod 22 is a part and urges the engine throttle toward the zero throttle position. A transfer bracket 26 is secured to the rod 22 to provide a connecting joint for the control. A control operating lever 28 is pivotally connected to the transfer bracket 26 by its forked end 30 and the pivot pin 32. Lever 28 is also attached by a pivot 34 to a bracket 36 suitably attached to a portion of the engine or vehicle engine compartment by mounting bracket 38. A pin 40 extends through lever 42 and receives a servo rod 44. Lever 42 is also pivotally secured to pivot pin 34 and is normally movable with lever 28 by means of the throttle block override spring 46 and tab 47, as also illustrated in FIGURE 6. When necessary during operation of the vehicle, lever 28 may be moved against the force of spring 46 relative to lever 42 so as to disengage tab 47 from lever 28 and permit operation of the engine throttle to override the throttle block condition.

A servo assembly 48 includes a housing 50 divided by a flexible diaphragm 52 into a throttle block chamber 54 and a cruise chamber 56. The servo assembly 48 is mounted to a stationary portion of the vehicle and in suitable alignment with other portions of the system. Servo rod 44 extends through chamber 56 and one side of housing 50 through a seal 58 and is attached to flexible diaphragm 52 and movable therewith. A conduit 60 connects cruise chamber 56 to the cruise engaging valve assembly 62. A branch conduit 64 from conduit 60 may have an air filter 66 therein and terminate at a vent 68 controlled by a normally closed valve 70. This valve may be operated by the vehicle transmission selector mechanism so that vent 68 is closed only when the transmission is in the drive position and under all other conditions is open to vent conduit 60 and, therefore, chamber 56 to atmosphere. Another branch conduit 72 is connected with conduit 60 and provided with an air filter 74 and terminating at the vent 76. Normally closed valve 78 controls vent 76 and is connected to the brake actuating arm 80 so that vent 76 is open whenever the vehicle operator depresses brake pedal 82 against the brake pedal return spring 84. Spring 84 will normally act to keep valve 78 in the vent-closed position. The cruise engaging valve assembly 62 includes a housing 86 which may be the existing vehicle turn signal arm modified to receive the internal components of the assembly. Conduit 60 is connected with the inner passage 88 at one end of that passage. The other end of passage 88 is occupied by the cruise set button 92 which is biased outwardly by spring 96 so that inner passage 88 is vented to the atmosphere through vent 98 when the button is in its outer position. A seat seal 100 may be engaged by the head of button 92 so that passage 88 is closed at the button and when the cruise condition of the control is set. A valve rod 102 is secured to the button 92 and has a valve 104 on the end opposite the button for controlling the admission of engine vacuum to conduit 60 through vacuum conduit 106. A valve seat 108 is provided in the end of conduit 106 which extends into housing 86 and is positioned so that the end of conduit 106 is closed when button 92 approaches the outer end of passage 88, and is open when button 92 engages seat seal 100. Vacuum conduit 106 is connected through a conduit 109 to engine vacuum from the engine intake manifold or any other suitable vacuum source. Vacuum may thus be supplied to cruise chamber 56 through conduit 60 and enter passage 88 from conduit 106 when valve 104 is opened. The differential pressure in passage 88 as compared to atmospheric pressure will hold button 92 against seat seal 100 until atmospheric pressure is again admitted to conduit 60 and chamber 88. Spring 96 is of an appropriate size and strength in relation to the area of button 92 and the force of engine vacuum to accomplish this result. However, spring 96 is sufficiently strong to hold valve 104 against seat 108 when vent 98 opens passage 88 to the atmosphere.

Throttle block chamber 54 is connected by conduit 110 to the speed control valve assembly 112. This assembly includes a housing 114 defining a chamber 116 which is connected to conduit 110, the vacuum supply conduit 109 and the atmospheric air supply conduit 118. An air filter 120 may be provided in conduit 118 to filter atmospheric air which may enter chamber 116. A valve unit 122 is pivotally supported at 124 in chamber 116 and is provided with valve seats 126 and 128 on opposite sides of pivot 124 which are in sealable alignment with the ends 130 and 132 of conduits 109 and 118, respectively. Valve seat 126 can open and close conduit end 130 while valve seat 128 is closing and opening atmospheric conduit end 132. An armature 134 is attached to valve unit 122 and is aligned with the solenoid core 136 which also extends into chamber 116. Tension spring 138 is attached to valve unit 122 and urges armature 134 away from core 136. Core 136 may be magnetically energized by the solenoid coil 140 of the electromagnetic assembly 142 in a manner to be described. When core 136 is magnetically energized, valve unit 122 pivots counterclockwise by magnetic attraction of armature 134 so that air supply conduit 118 is closed by valve seat 128 and vacuum conduit 109 is opened to chamber 116. When core 136 is deenergized, spring 138 pivots valve unit 122 clockwise so that valve seat 126 closes vacuum supply conduit 109 and valve seat 128 opens atmospheric air supply conduit to chamber 116. If desired, valve seats 126 and 128 may be on the same side of pivot 124, which conduit ends 130 and 132 being disposed on opposite sides of arm 122 to obtain the same effect.

The electrical portion of the control system is provided to energize the solenoid coil 140 in the proper proportion of time so that desired control of the vehicle engine speed is obtained. Coil 140 is connected through lead 144 through the ignition switch 146 to the positive side of the vehicle electrical system. Since most vehicles in production today use a 12 volt electrical system, that voltage is indicated in the diagrammatic figures. Electrical lead 148 is connected to the other end of coil 140 and through the electronic transistor type amplifier 150 and lead 152 to ground. The amplifier 150 is an on-off switch-type amplifier for which the contact signal is attained by an electrical circuit 154 having a low current. Circuit 154 has resistors 156 and 158 therein as well as the speed sensing unit 160 which may be a part of the vehicle speedometer unit. Lead 162 of circuit 154 contains resistor 158 and connects through lead 164 to amplifier 150 and also to the unit 160. Lead 166 connects resistor 156 to lead 164 and lead 167 connects resistor 156 through the ignition switch 146 to the positive side of the vehicle electrical system. Lead 168 connects the speed sensing unit 160 to ground.

The speed sensing unit 160, which may be referred to as a speed transducer, is illustrated in FIGURE 1 as being integral with the vehicle speedometer. The speedometer indicating needle 170 is driven by a speedometer speed cup in the well known manner and is pivoted about the pivot pin 172. A torsion type contact spring 174 is coiled so that its inner end 176 is attached to pivot pin 172 and its outer end 178 is bent to extend radially outward in a direction opposite the needle 170 and beyond a post 180 on the needle structure so that spring end 178 engages one side of the post 108. In the construction illustrated, spring end 178 is positioned on the counterclockwise side of the post as seen in FIGURE 1. A speed set sector gear 182 is also pivoted about a pin 172 and has a pointer-indicator arm 184 secured thereto which may indicate the desired cruise speed on the speedometer dial. Arm 184 is adjusted by means of gear 182, gear 186, which meshes with gear 182, and rod 188 which rotates gear 186, the arcuate extent of sector 182 limiting the maximum and minimum speeds at which arm 184 may be set.

A handle or knob 190 may extend into the vehicle passenger compartment to a point convenient to the vehicle operator for setting the desired cruise or warning speed. An electrical contact 192 is operatively mounted on gear 182 diametrically opposite arm 184 and is so secured to gear 182 that it may oscillate a desired amount either side of the center line of arm 184. Thus, for example, without moving arm 184, contact 192 may oscillate with a 10 mile per hour indicated amplitude as illustrated by the contact extreme positions 194 and 196. This oscillation may be furnished by a mechanism similar to that illustrated in FIGURES 4 and 5 described below.

As the vehicle speed increases, needle 170 will move clockwise and contact spring end 178 will move into the oscillating arc of contact 192. As it touches contact 192 the circuit is completed through leads 162 and 168. This circuit is broken when post 180 moves spring contact end 178 out of the oscillating arc of contact 192 and also when post 180 prevents the spring end 178 from passing through a portion of that arc. Thus, as spring end 178 reaches point 196 it will barely make contact during the oscillating cycle of contact 192. As it reaches point 192, it will make contact approximately half of the cycle time. If speedometer needle 170 and, therefore, post 180 should permit spring end 178 to move to position 194 or clockwise therebeyond, the spring would remain in engagement with contact 192 at all times even though the contact is oscillating.

Figure 3:
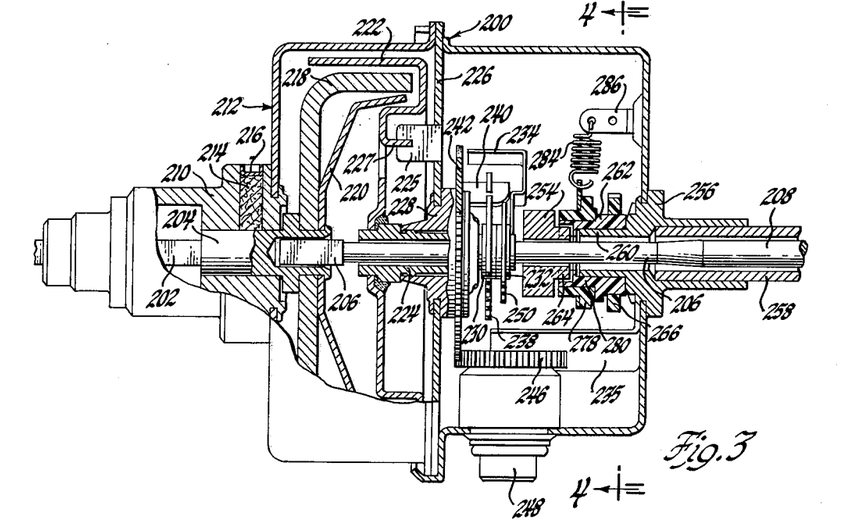
FIGURE 3 is a view of a speed transducer assembly which may be used in the system of FIGURE 1, with parts broken away and in section.
Figure 4:
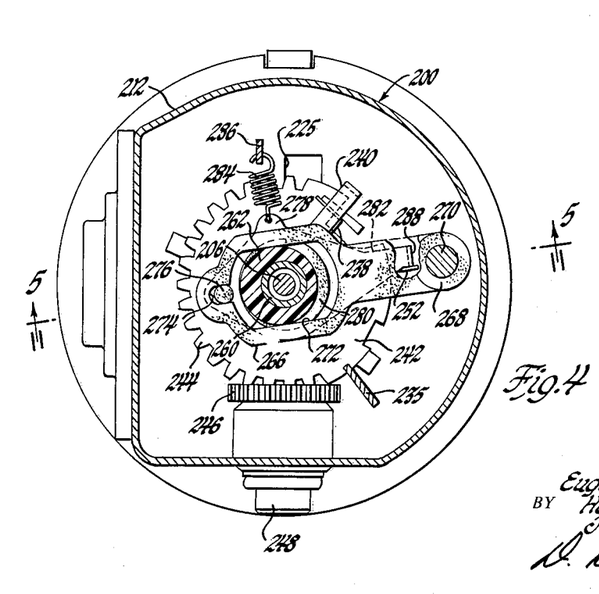
FIGURE 4 is a cross-section view of a speed transducer of FIGURE 3 taken in the direction of arrows 4—4 of that figure.
Figure 5:
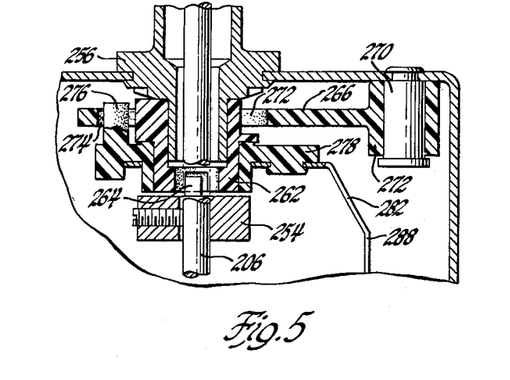
FIGURE 5 is a partial section view of the speed transducer of FIGURE 3 as taken in the direction of arrows 5—5 of FIGURE 4.

FIGURES 3, 4 and 5 illustrate a speed transducer unit which will sense speed in the same manner as the speed sensing unit 160. This unit is best adapted for installation in vehicles having existing speedometers and may be installed at any suitable position in the speedometer drive line. For convenience, however, it is preferably installed adjacent the speedometer. The speedometer drive cable is attached to the unit 200 at 202 and drives magnet drive shaft 204. A shaft 206 is journaled in the inner end of shaft 204 and extends through the speed transducer unit 200 and is connected with the speedometer drive 208 which may drive the vehicle speedometer. Shaft 204 rotates in bearing 210 received in one end of housing unit 212. This bearing may be suitably lubricated by wick 214 which is contained in a radially extending passage in bearing 210 and sealed by cap 216. A magnet 218 and a temperature compensating element 220 are secured to the inner end of shaft 204 and rotatable therewith. A speed cup 222 is mounted on a hollow shaft 224 received concentrically about a part of shaft 206 but radially spaced therefrom. A field plate 226 is mounted in unit housing 212 and extends transversely of the axis of the shaft 206. A stop tab 225 is struck out of plate 226 and is engageable with a cooperating tab 227 struck out of speed cup 222 to prevent the speed cup from rotating beyond the maximum speed at which control may be desirable so as to protect the elements associated therewith from damage if such speeds are attained. Tab 227 is shown rotated out of position in FIGURE 3 to indicate this engaging action. A bearing 228 is received in field plate 226 for supporting speed cup shaft 224. Shaft 224 extends through and beyond bearing 228 and has a speed hairspring mounting collar 230, a contact hairspring collar 232 and a contact hairspring pick-up arm 234 mounted thereon so that they rotate as the speed cup 222 is rotated by action of the rotating magnet 218. Stop 235 fastened to housing 212, will prevent arm 234 from engaging gear 246 at high vehicle speeds. A speed hairspring 238 is torsionally wound and has its inner end secured to collar 230 and its outer end secured to the speed hairspring holding tab 240 formed on the hairspring regulator 242. Regulator 242 has a geared section 244 and is so mounted on bearing 228 as to be rotatable thereabout to pre-tension spring 238. This rotation is accomplished by meshing gear 246 and a suitable manual drive 248 which may be rotated by the vehicle operator to set the desired unit command speed. A contact hairspring 250 has its inner end secured to collar 232 and is torisonally wound so that its outer end 252 is biased against arm 234.

A retaining end drive collet 254 is secured in drive relationship with shaft 206 adjacent arm 234. A bushing 256 is secured in the other end of housing 212 from bearing 210 to which the sheath 258 of the speedometer drive 208 may be attached. Bushing 256 has a quill section 260 extending inwardly toward collet 254 and radially spaced from shaft 206. An eccentric cam 262 is pivotally mounted on quill section 260 and is drivingly engaged with ears 264 on collet 254 so as to be driven as shaft 206 rotates.

Cam follower arm 266 is journaled at one end 268 about a pin 270 which is attached to the end of housing 212 containing bushing 256. Arm 266 has a slot 272 formed therein in which eccentric cam 262 is received so that as the cam is rotated arm 266 is pivoted about pin 270. Arm 266, therefore, has one oscillating cycle per revolution of the speedometer drive when eccentric cam 262 is formed as illustrated. It may be formed so as to provide more cycles per revolution if desired. Slot 272 has a recessed section 274 extending opposite journal 268 in which a pin 276 of an oscillator arm assembly 278 is received. Arm assembly 278 is mounted on a sleeve 280 extending from eccentric cam 262 so that it has a pivot axis coincident with the axis of shaft 206. An oscillator contact arm 282 forms a part of assembly 278. Tension spring 284 is attached to arm 282 and to a bracket 286 on housing 212 to urge oscillator arm assembly 278 in a clockwise direction as seen in FIGURE 4 and, therefore, urge cam follower arm 266 into continuous contact with cam 262. Oscillator contact arm 282 has an extending end 288 which normally engages the outer end 252 of contact hairspring 250 and cooperates therewith to provide a set of make-and-break contacts. Therefore, as the unit is being driven, the outer contact spring end 252 is oscillated, for example, through an arc equivalent to 10 miles per hour vehicle speed. As contact pickup arm 234 is rotated in accordance with increasing vehicle speed, it contacts hairspring end 252 for a greater or lesser portion of the oscillating cycle to break electrical contact between hairspring 250 and contact end 288. Hairspring 250 is electrically grounded through speed cup shaft 224. Contact 282 with its end 288 is insulated from ground by oscillator arm 278 with the electrical connection for lead 162 of FIGURES 1 and 7 being made through spring 284 and bracket 286.

When the vehicle is traveling under its own power but well below the set speed for either speed warning or cruise modes, the system is in the condition shown in FIGURE 1. The cruise button 92 is in its outer position and air at atmospheric pressure is contained in conduit 60 and cruise chamber 56. The speedometer needle 170 is indicating a vehicle speed which is considerably less than the speed at which indicator arm 184 is set. The end 178 of contact spring 174, therefore, does not at any time engage contact 192 to complete the electrical circuit 154. Solenoid core 136 is thus deenergized at all times and valve unit 122 is positioned so that air under atmospheric pressure is admitted through conduit 118, chamber 116 and conduit 110 to the throttle block chamber 54. Diaphragm 52 is exposed to atmospheric pressure on both sides and there is no fluid force tending to move lever 28 in either direction. The throttle linkage 22 may, therefore, be moved to any desired position by manipulation of the accelerator pedal 20 without encountering resistance due to fluid forces in the control system. As the throttle linkage 22 is moved toward the open and closed throttle positions, lever 28, rod 44 and diaphragm 52 will follow its movement. Engine vacuum imposed in conduits 106 and 109 terminates at valve seats 108 and 126 since the conduits are closed by these seats.

When speedometer needle 170 has moved to such a position that contact spring end 178 enters the oscillation zone, or proportional control zone of contact 192, spring end 178 begins engaging the contact 192 at the low speed end of its oscillating stroke. Contacts 178 and 192 are, therefore, closed, first for a very small percentage of oscillation cycle and then for a greater percentage of that cycle as the vehicle speed increases and moves spring contact end 178 nearer the center of mean position of the oscillation zone of contact 192. The larger the percentage of the oscillation cycle time that contact 178 is in engagement with contact 192, the greater percentage of the time is solenoid core 136 magnetically energized and, therefore, the greater percentage of time is vacuum admitted into chamber 116 of the speed control valve assembly 112, and the lesser percentage of time is air at atmospheric pressure admitted to chamber 116 through conduit 118. An air pressure is, therefore, obtained in chamber 116 which may be considered to be a mixture of vacuum and atmospheric air, the absolute pressure of which is determined by the percentage of the oscillation cycle in which solenoid core 136 is energized. This mixture may be referred to as the cycling pressure or control pressure and is imposed on diaphragm 52 through conduit 110 and throttle block chamber 54. The cycling pressure is a net result reflected as a decrease in absolute pressure in chambers 116 and 54 which urges diaphragm 52 to the right under influence of greater pressure in chamber 56. A force is, therefore, exerted by the servo 48 on the operating lever 28 through rod 44, lever 42 and stop 47 which tends to move throttle linkage 22 toward the closed throttle position and appears as a back pressure on the accelerator pedal 20. This pressure is sufficient to provide a throttle block feel to the operator. If the operator continues to hold the accelerator pedal down so that the vehicle accelerates further, contact 178 will engage contact 192 a greater percentage of time and, therefore, a greater vacuum will be impressed in chamber 54 and a greater back pressure will be felt against the accelerator pedal. When the vehicle operator so desires, he may press accelerator pedal 20 downward against the back pressure so as to increase throttle opening and vehicle speed even through diaphragm 52 is moved to the right. This is accomplished by the lost relative motion arrangement including levers 28 and 42, stop 47 and spring 46.

Figure 2:
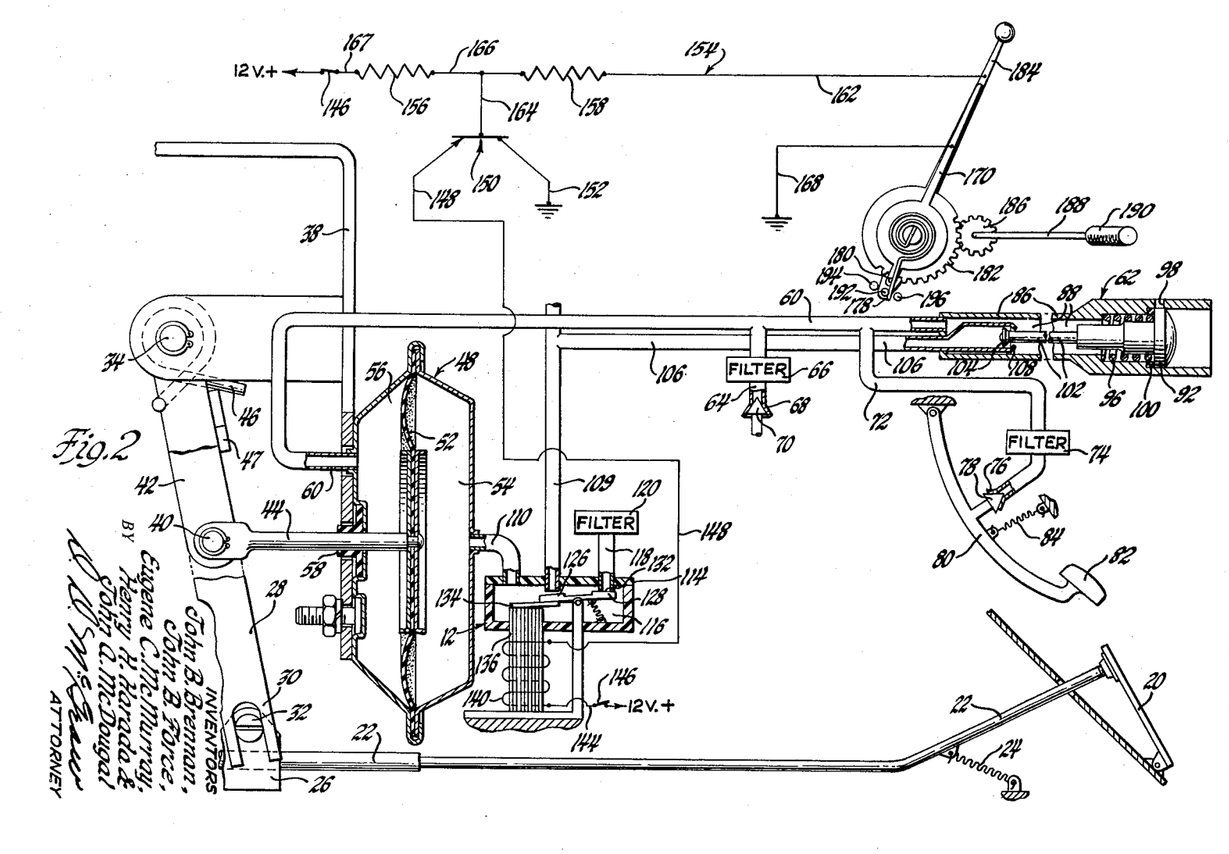
FIGURE 2 is similar to FIGURE 1 and shows the system in the cruise control mode of operation.

FIGURE 2 shows the system in the cruise mode with the vehicle traveling at the set road speed. This is accomplished by pressing the cruise set button 92 inwardly so that it engages seat seal 100 to close off vent 98. Valve 104 is then unseated from its seat 108 and vacuum from conduit 106 is admitted to chamber 88 and through conduits 60 to cruise chamber 56 of the servo 48. Button 62 may be pressed inwardly at any time regardless of the speed of the vehicle. If this is done while the vehicle is at a speed well below the cruise set speed, vacuum in chamber 56 will move diaphragm 52 to the left. The diaphragm will act through rod 44 and level 42 to move the throttle rod 22 toward the open throttle position. The engine throttle will then be opened so that vehicle speed is increased until the set cruise speed is attained. When this speed is attained, contacts 178 and 192 will control solenoid 140 and valve unit 122 so that the valve unit is oscillating at the same frequency as contact 192 and a sufficiently low cycling pressure is maintained in throttle block chamber 54 to balance diaphragm 52 so that the throttle rod 22 is positioned to maintain the set speed.

When the vehicle speed tends to overrun the set cruise speed, such as when it is on a downgrade, for example, the control unit will allow the throttle return spring to move the engine throttle toward the closed position to decrease the power delivered by the engine and counteract the tendency to overrun the set speed. The unit will tend to accomplish the same result when the vehicle operator has pressed the accelerator pedal downwardly to temporarily accelerate above the set cruise speed for any reason. Contacts 178 and 192 will be closed a greater percentage of the oscillating cycle of contact 192 and, assuming the spacing of positions 194 and 196 of contact 192 to be equivalent to a 10 m.p.h. vehicle speed range, if the vehicle is accelerated 5 m.p.h. over the set speed, these contacts will be closed at all times. The atmospheric air conduit 118 will be closed a corresponding percentage of the cycle time by valve seat 128 and may be closed all of the time. The vacuum conduit 109 will then be connected without interruption to the throttle block chamber 54. This will allow the throttle return spring to cause diaphragm 52 to move to the right, thereby closing or tending to close the engine throttle to decrease speed. Therefore, at the extreme condition, engine vacuum will be in conduits 60, 106, 109 and 110 and chambers 116, 54, and 56.

If the vehicle brakes are applied while the vehicle is cruising under influence of the control unit at the set cruise speed, valve 78 will be unseated and vent 76 will be opened thereby venting conduits 72 and 60 and cruise chamber 56 to atmosphere. The cycling pressure in throttle block chamber 54 will remain since the vehicle speed has momentarily remained the same. The absolute pressure in chamber 54 may then momentarily increase as the vehicle speed drops due to brake action. The atmospheric pressure in chamber 56 entering through vent 76 will move diaphragm 52 to the right and this motion will be transmitted to throttle rod 22 to close the engine throttle. Since atmospheric pressure is also admitted to passage 88 of the valve assembly 62, there will be insufficient differential pressure acting on button 92 to hold it against seat seal 100 and compression spring 96 will move the button to its outer position until valve 104 engages seat 108. Conduit 60 will then be vented to atmosphere through vent 98 and passage 88 and will remain vented to atmosphere even though the brake pedal is released and valve 78 again closes vent 76. The unit will then be in the condition illustrated in FIGURE 1 and described above.

Figure 7:
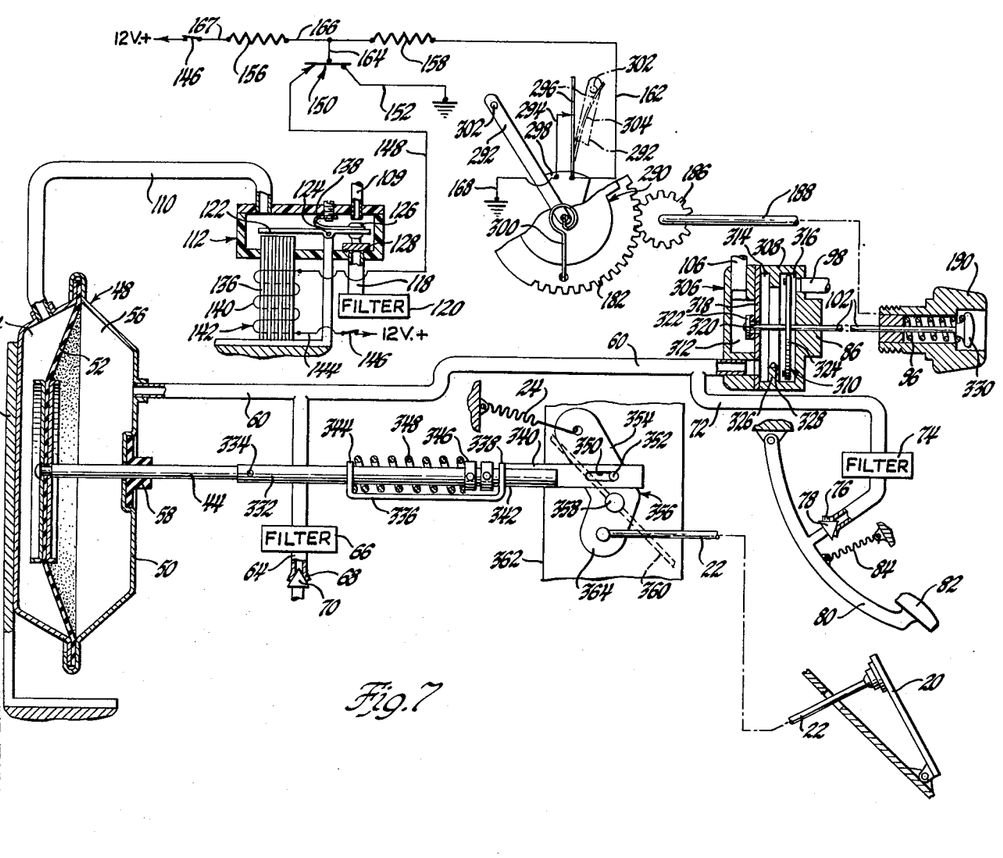
FIGURE 7 is a diagrammatic view of a modified system illustrated in the manner of FIGURE 1.

FIGURE 7 illustrates a modification of the system which may be installed as an after-market accessory. It may use the speed transducer of FIGURE 3 which is a speed sensing unit of the type illustrated diagrammatically in FIGURE 7. The various elements in the system of FIGURE 7 which are comparable to the elements in FIGURES 1 and 2 have been assigned the same reference numbers. In this modification servo rod 44 extends through the cruise chamber 56 and away from throttle block chamber 54. A slightly modified speed control valve assembly 112 is used although it is rearranged to function in the reverse manner as compared to the assembly of FIGURES 1 and 2. In this instance, valve seats 126 and 128 oppose each other on opposite sides of one end of the pivoting lever section of valve unit 122 and conduits 109 and 118 are aligned therewith. Spring 138 is of the cantilever type and normally urges valve seat 128 into engagement with the end of conduit 118 to close that conduit. The speed sensing unit 290 operates as a speed transducer and includes an arm 292 which rotates with a speed cup so that it moves clockwise as vehicle speed is increased. Contacts 294 and 296 are mounted on an oscillating arm 298 which oscillates through an arc preferably equivalent to 10 m.p.h. of vehicle speed. The oscillation is obtained from cam action of a drive cable in the manner described above. Gear 186 will again adjust the position of gear 182 to determine the set cruise speed or speed warning speed. Contact 296 is in the form of a spring and is connected through lead 162 and resistor 158 to the transistor 150 as before. A torsion spring 300 is connected to gear 182 and resists movement of arm 292 a variable amount depending upon the position of gear 182, thus providing the mechanism for setting the desired speed. As arm 292 moves to the right under increasing vehicle speed influence, it will enter the oscillating zone of contacts 294 and 296 and pin 302 extending from the end of arm 292 will engage contact 296 a proportional period of the oscillating cycle, and will hold contacts 294 and 296 open for a predetermined period of time depending upon the vehicle speed's relation to the set speed. If the vehicle speed passes beyond the cruise set speed more than 5 m.p.h., for example, contact 296 will be held in position 304 and will not engage contact 294 at any time. The engagement and disengagement of contacts 294 and 296 will cause an electrical signal to be transmitted to the electromagnet assembly 142 and cause a proportional signal comprised of vacuum and atmospheric air to be transmitted to the throttle block chamber 54, causing diaphragm 52 to move to the left.

The control valve assembly 306 performs the same function as does the valve assembly 62 of FIGURES 1 and 2 but is constructed somewhat differently. It includes a housing 308 in which is mounted the compound valve 310. Housing 308 is divided into chambers 312, 314 and 316. Vacuum supply conduit 106 is connected with chamber 312 and conduit 60 is connected with chamber 314. A wall 318 separates chamber 312 from chamber 314 and is provided with an orifice 320 which is opened and closed by a disk-like valve section 322 of the compound valve 310. Valve section 322 is mounted on the end of valve rod 102 which extends into housing 308, through chambers 314 and 316 and into chamber 312. Another disk-like valve section 324 is secured to rod 102 in spaced relation to section 322 and is contained within chamber 316. Chambers 314 and 316 are separated by web 326 through which a large orifice 328 is provided. Valve section 324 can be moved to the left to seat against one side of web 326 and close orifice 328 while valve section 322 is disengaged from wall 318 to open orifice 320. Knob 330 on rod 102 is provided to move valve 310 to this position and also to move the valve so that valve section 322 seals orifice 320 while valve section 324 opens orifice 328. Spring 96 acting against knob 330 and contained within knob 190 urges valve assembly 310 to the latter position.

Knob 190 is illustrated as being concentric with and providing a mounting for knob 330 and also providing for rotational movement of rod 188 and gear 186 for adjusting the set speed. Vent 98 connects chamber 316 to atmosphere at all times. The control valve assembly 306 is illustrated in the released position. When it is desired to engage the control unit for automatic cruising, knob 330 is pushed inwardly of knob 190 against spring 96 until valve section 324 closes the large orifice 328 and valve section 322 opens the small orifice 320. Engine vacuum is then connected from conduit 106 through chamber 312 and opening 320 to chamber 314 and conduit 60. The pressure differential across valve section 324 holds the valve in this position against spring 96 until the engine vacuum in chamber 314 approaches sufficiently close to atmospheric pressure so that the pressure differential is insufficient to oppose spring 96. The valve assembly under this condition would move to the released position. In the released position conduit 106 and chamber 312 are disconnected from chamber 314 by the closing of orifice 320 by valve section 322. Since valve section 324 has opened to interconnect chambers 314 and 316, atmospheric pressure is admitted to chamber 314 and conduit 60. It is, therefore, also admitted to the servo chamber 56.

The cycling pressure in cruise chamber 54 opposes vacuum in chamber 56 when the control is operating in the cruise mode so that pressure equalization allows diaphragm 52 to move with the throttle linkage toward the closed throttle position under influence of the throttle return spring. The servo assembly 48 will again act as an integration unit to smooth out the pulses in chamber 54 and provide partial cancellation of the variations in raw engine vacuum transmitted to chamber 56 which may be due to varying engine load conditions.

Diaphragm 52 will move rod 44, to which is connected a rod extension 332. This extension is pivotally connected at 334 to rod 44 to permit slight angular variations of the shaft extension during throttle linkage movement without working laterally against the shaft seal 58. A bracket 336 is secured at 338 to shaft extension 340 and slidably receives shaft extension 332 at 342. Bracket 336 is also slidably received about extension 332 at 344. A collar 346 on extension 332 acts as a reaction point for compression spring 348 which has its other reaction point on the end 344 of the bracket 336. This provides a typical lost motion linkage which will yield after a predetermined load. Extension 340 has an elongated slot 350 in the end opposite its connection with bracket 336. A pin 352 is mounted on arm 354 of throttle bell crank lever 356. Lever 356 is attached directly to the throttle valve shaft 358 so that it will rotate the throttle valve 360 in the engine air intake 362 when the lever is moved. The other arm 364 of lever 356 is connected to the accelerator linkage 22 for actuation of the throttle by the accelerator pedal 20. The throttle return spring 24 is attached to the end of arm 354 to urge the throttle toward the closed position. Assuming the unit to be operating at less than the set speed without having the speed adjustment control assembly 306 in engagement, air at atmospheric pressure is contained in both chambers 54 and 56 of the servo 48. Thus, diaphragm 52 and rod 44 as well as rod extension 332 and 340 tend to move only when moved by the accelerator linkage 22. When the throttle valve 360 is in the closed position pin 352 is in the right end of slot 350 as illustrated in FIGURE 7. Thus, when the accelerator pedal is first moved toward the open throttle position, pin 352 will act through rod 44 and its extension to move diaphragm 52 to the right. The diaphragm as well as rod 44 and its extension 332 and 340 will remain in its position until they are moved again. The accelerator linkage 22 and the lever 356 can then be moved without axially moving rod extension 340 so long as the movement remains within the limits prescribed by slot 350. This freedom of movement may be equivalent to a throttle angle of approximately 35°. Thus, throughout most of the normal operating range of the throttle during manual throttle control, the cruise control unit provides no resistance whatever to throttle actuation. When the unit is operating in the automatic cruise condition, however, diaphragm 52 is moved to control the throttle without regard to the 35° of throttle lost motion since under these conditions the throttle return spring 24 will keep the pin 352 in the left end of the slot 350, as seen in FIGURE 7, and the diaphragm 52 will normally be urged to the right against the force of spring 24 under influence of full engine vacuum in chamber 56 so that the slot is ineffective.

There are two modes of operation of the system available to the vehicle operator. The first mode is called the speed warning mode and is always present. The function of this mode of operation is to warn the driver when the set speed has been reached by causing the accelerator pedal of the car to resist further depression. If the driver does not desire to use this mode of operation, he may turn the speed set indicator so that it indicates a speed above that at which he intends to operate the vehicle. The driver may override the back pressure on the pedal which serves as a speed warning by exerting additional force on the pedal.

The second mode of operation is the cruise control mode. This condition is obtained by pushing the speed set button at which time the vehicle will automatically assume the preset speed and maintain it continually within the engine power output and engine braking capabilities. Operation in the cruise control mode may be discontinued by touching the brake pedal and the condition will not be reset until the speed set button is again pushed inwardly.

Figure 8:
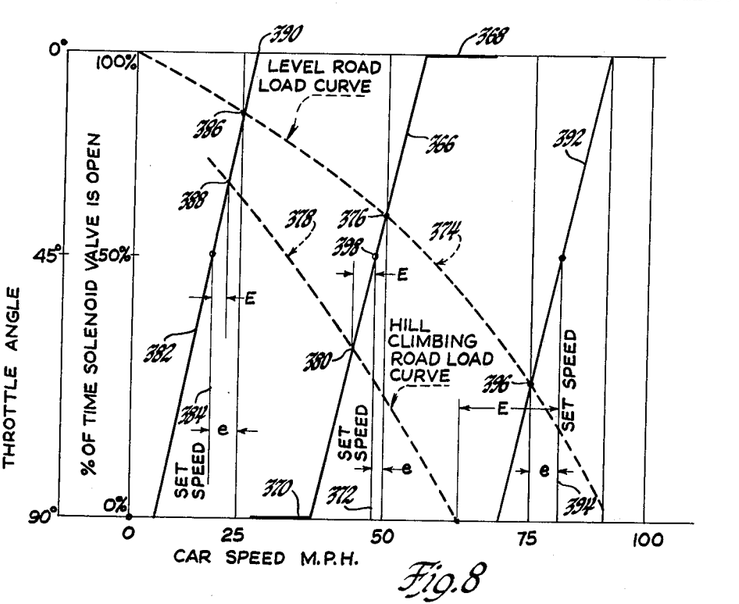
FIGURE 8 is a graph illustrating the system characteristics for three speed conditions.

FIGURE 8 contains several curves which graphically illustrate the system characteristics for three set speed conditions. The abscissa is graduated in miles per hour to indicate vehicle speed. Two ordinates are provided, one of them is graduated in percentages with 0% at the abscissa and increasing to 100%. This ordinate indicates the percentage of oscillating cycle time of the speed transducer that the solenoid control valve in the speed control valve assembly 112 is open. The second ordinate is degrees of throttle angle over a range of 0° to 90° with the 90° point being at the abscissa. There is a 1:1 correspondence ratio between the values on these scales.

The slanted curve 366 in the center of the graph shows zero throttle saturation at 368 and full throttle saturation at 370. It illustrates the speed range of proportional control of the system for a given manual setting of the control knob, this setting being indicated by the set speed line 372. The range of proportional control of the system is the abscissa difference between the saturation points 368 and 370. For example, we might have a 10 m.p.h. range of proportional control. The stable operating point at which we operate on a curve 366 is dependent upon the load. The upper curve 374 is a road load curve for a level road and has a stable operating point 376 where curve 374 intersects curve 366. If, however, the vehicle has a road load increase imposed, as for example, by ascending a grade, the entire road load curve moves downward, indicating a requirement for a larger throttle opening angle. Curve 378 is plotted to indicate a hill climbing road load curve. A new stable operating point 380 is established and the vehicle has lost some speed. This is indicated by the fact that the abscissa of the stable operating point has changed slightly. The larger the range of proportional control, or the flatter curve 366 is, the more speed will be lost due to load changes. It is, therefore, advantageous to keep curve 366 as nearly vertical as possible. Under these circumstances the error produced by changing the load will also be smaller. If, however, the curve 366 is absolutely vertical so that the saturation points 368 and 370 occur at the same vehicle speed, we would be operating with on-off contactors having servos that tend to be oscillatory. Therefore, by providing a proportional control range it is possible to stabilize the entire system.

The other curves in the graph illustrate different settings of the manual set speed knob. Curve 382 illustrates the proportional control zone for a lower desired speed such as that indicated by set speed line 384. It is noted that the stable operating points 386 and 388 are nearer the zero throttle saturation point 390 than the comparable stable operating points of curve 366. Both the level road load curve 374 and the hill climbing road load curve 378 intersect curve 382 within the range of proportional control. Curve 392 is for a higher desired speed. It will be noted that the set speed indicated by line 394 is approximately 80 miles per hour. The stable operating point 396 for the level road load condition is within the range of proportional control. However, the intersecting of curve 378 with curve 392 indicates that the stable operating point under the hill climbing road load condition curve 378 is outside the range of proportional control. The throttle angle would be 90°, or fully opened. Thus, if the system were operating with a manual transmission, the vehicle would have the throttle wide open but would be unable to maintain a speed of 80 miles per hour up a hill imposing the load indicated by curve 378. Using the system with an automatic transmission, the transmission would automatically downshift to a lower range and the vehicle would possibly negotiate the hill at 75 miles per hour because of the downshift, if the engine were capable of producing sufficient power.

The letter $e$ indicates level road error, or the difference between the stable operating point 376, for example, and the set speed point 398 on curve 366. If, for example, the set speed is 49 miles per hour, the level road error $e$ may be about 1 mile per hour. The latter $E$ indicates the hill climbing road load error as calculated by the vehicle speed difference between the set speed point 398 and the hill climbing stable operating point 380. Error $E$ is on the opposite side of said speed line 372 from error $e$. In the proportional control range illustrated by curve 366, there is some one vehicle speed at which error $E$ will be zero. At all other speeds, error $E$ will exist and its range will depend upon the range of proportional control built into the system. Proportional control range is determined by the dithering range of oscillating contact in the speed transducer. Thus, if the oscillating contact moves throughout a cycle range equivalent to 10 m.p.h. vehicle speed, the range of proportional control will be 10 m.p.h. with the cruise set speed being at the mid-point of the range.

Under normal operation the unit remains in the range of proportional control and does not operate at either saturation point. Saturation is used as a term referring to wide open throttle or fully closed throttle conditions. If the unit operates in saturation, a surging condition is obtained because there is too much gain in the system. The system is acting as a simple throttle lock, holding the throttle at either a 0° or 90° angle. If the vehicle is descending a relatively steep grade, the unit will go into zero throttle saturation and close the throttle. At the same time the vehicle may pick up speed. Under this condition the operator will have to use the vehicle brakes if the increase in speed is undesirable. This, in effect, would put a break in the curve 366, for example, and raise the saturation point 368 upwardly on the chart beyond the zero throttle position. If the vehicle is furnished with a more powerful engine, the full throttle saturation point 370 is dropped so that the vehicle may climb a steeper hill while remaining within the range of proportional control.

Figure 9:
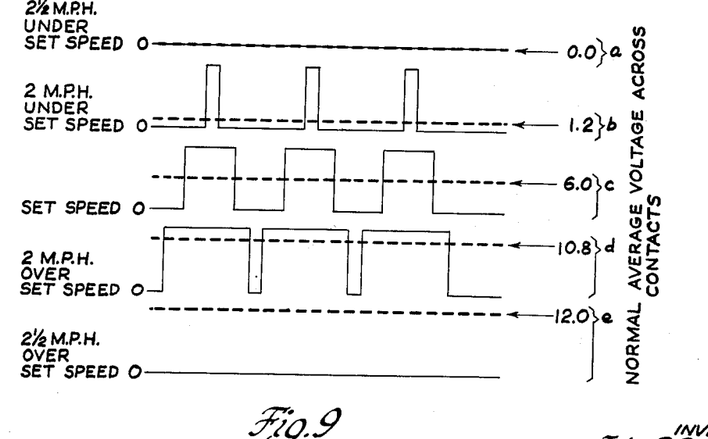
FIGURE 9 is a graph illustrating the error detection function of the speed transducer used in the system.

FIGURE 9 is a graphic illustration of the operation of a speed transducer or error detector at various points in the proportional control range. The abscissa is time, and the plot indicates the opening and closing of the contacts 178 and 192 of FIGURE 1, contacts 252 and 228 of FIGURE 4 or contacts 294 and 296 of FIGURE 7. The plot indicates normally closed contacts, such as those of FIGURES 4 and 7, and would be the reverse for the normally open contacts of FIGURES 1 and 2. As discussed above, a range of proportional control is obtained by oscillating a contact over a range of, for example, five miles per hour about a median position. The median position is the set or command speed. The angular oscillation is obtained mechanically by means of an eccentric such as that shown in FIGURES 3, 4 and 5. It has been found satisfactory to use a drive which rotates at 1,000 revolutions per mile, the speed at which the usual speedometer drive shaft rotates, providing an oscillation frequency of one cycle for every 5.28 feet that the vehicle travels over the road.

If the automobile is traveling more than 2½ miles per hour below the set speed, the contacts will be closed at all times, using a 5 m.p.h. proportional control zone. If an electrical current is passed through these contacts, the voltage drop across the contacts will be zero because the contacts remain closed. This is illustrated in curve $a$ of FIGURE 9.

When the vehicle is traveling, for example, two miles per hour under the set speed, the contacts will be opened during a small portion of the oscillation cycle. While they are open the voltage across the contact will be 12 volts or full battery voltage. For the remainder of the cycle the contacts are closed and the voltage across the contacts is again zero. Thus, the average voltage across the contacts over a period of time may be 1.2 volts as indicated by curve $b$ of FIGURE 9.

When the vehicle is traveling at the set speed as represented by the mid position of the oscillating contacts, the contacts are open half the time and closed half the time. Thus, the voltage across the contacts is zero for half of the time and 12 volts for half of the time, producing an average voltage across the contacts over a period of time of six volts as indicated in curve $c$ of FIGURE 9.

If the vehicle is traveling two miles per hour over the set speed, contacts will be opened a greater percentage of the oscillation cycle time and the average voltage level across the contact becomes 10.8 volts as indicated in curve $d$ of FIGURE 9.

If the vehicle is traveling more than 2½ miles per hour over the set speed, the contacts will open all the time and the average voltage across them will be 12 volts. This is shown in curve $e$ of FIGURE 9.

A voltage output signal which is the error signal for the system is, therefore, provided which indicates accurately whether the vehicle is traveling below, at, or above the command speed, and the extent of error, within limits. This voltage is a proportional signal, and, in this example, zero error is represented by six volts with an underspeed condition represented by some lesser voltage and an overspeed condition represented by some greater voltage.

At the instant the contacts open several changes occur in the system in a very short time interval. Due to the inductance effect of the speed control valve coil 140, the voltage in lead 104 rises to a very high potential point.

The transistor 150 is forward biased and a current flows through resistor 156. Because of the amplifying action of the transistor, a heavy current flows through the emitter-collector junction to ground, allowing the voltage in lead 148 to rise to about 3 volts more positive than the supply. After a finite interval of time, the energy of the inductance is dissipated and the circuit is in the "off" condition until the contacts are again closed. In the "off" situation a small current of less than .001 ampere flows through resistance 156 and transistor 150 to ground through lead 152. A small current of about .006 ampere flows through lead 148 and coil 140.

The magnetic moment required to operate armature 134 is a function of the pneumatic and spring moments, the amount and type of metal in the flux return path, and the air gap opening. For approximately equal response time in each direction of operation, the amount of energy available from the magnetic flux circuit should be approximately twice that energy stored in spring 138. The energy in the flux is produced from current flowing through the solenoid and producing an electromagnetic force. This force is proportional to the coil voltage times core flux times coil turns divided by coil resistance and is inversely proportional to armature air gap travel. Thus, the proportional signal developed by the speed transducer operates to provide the cycling pressure which moves the diaphragm 52 of the unit to control the engine throttle and either provide a warning at the set speed or to maintain the vehicle at the set speed.

Stability of operation of the system is introduced into the power unit 48 when the system is operating in the cruise control mode by opposing the raw engine vacuum in chamber 56 with a differential pressure in chamber 54 which has raw engine vacuum as one of those components. The relatively high variations in raw engine vacuum, therefore, partially cancels itself. This feature of the system also partially compensates for variations in atmospheric pressure when the system is employed at different geographical elevations. While the compensation is not complete, it is sufficient to provide satisfactory speed control operations at all elevations normally encountered. The overall effect is to control speed at, for example, 50 miles per hour at sea level and, with the same setting, to maintain speed of about 48 miles per hour at an altitude of several thousand feet above sea level.

We claim:

1. A speed warning system for a variable speed unit having an operator operated unit speed controller, said system comprising, a speed transducer assembly having an actual unit speed input and a selective desired speed input and establishing a constant speed magnitude zone of proportional speed of less speed magnitude than the magnitude of speed unit variation and being substantially centered on said selective desired unit speed input and movable therewith as different desired unit speed inputs are selected, said assembly producing a continuously variable proportional control speed error signal output when said actual speed input is within said zone and a constant overspeed error signal output when said actual speed input is above said zone and a constant underspeed error signal output when said actual speed input is below said zone, a unit speed warning mechanism connected with said speed transducer assembly to receive said signal outputs therefrom and including a pressure control valve assembly having two different pressure inputs and a pressure output proportional to said proportional speed error signal and intermediate and continuously variable between said two different pressure inputs when said proportional control speed error signal is received and equal to one of said differential pressure inputs when said constant overspeed error signal is received and equal to the other of said differential pressure inputs when said constant underspeed error signal is received, said speed warning mechanism further including a pressure actuated motor responsive to said pressure output and adapted to be connected with said unit speed controller to exert a speed decreasing force thereon positively sensible by the unit operator for warning the unit operator when the actual unit speed increases to equal the selected desired unit speed put into said speed transducer assembly.

2. A variable speed unit speed maintaining control system comprising, means establishing a constant speed magnitude zone of proportional speed control and having an actual unit speed input and a selective desired unit speed input and a speed error signal output, said constant speed magnitude zone being of less speed magnitude than the magnitude of unit speed variation and being substantially centered on said selective desired unit speed input and movable therewith as different desired unit speed inputs are selected, said speed error signal output being a constant underspeed error signal when said actual speed input is below said zone and being a continuously variable porportional control speed error signal of greater magnitude than said constant underspeed error signal when said actual speed input is within said zone and being a constant overspeed error signal of greater magnitude than said continuously variable proportional control speed error signal when said actual speed input is above said zone, a unit speed maintaining control mechanism connected with said means to receive said speed error signal output therefrom and including a valve assembly having two different pressure inputs and a pressure output, said pressure output being equal to one of said two different pressure inputs when said underspeed error signal is received and being intermediate said two different pressure inputs when said continuously variable proportional speed error signal is received and being equal to the other of said two different pressure inputs when said overspeed error signal is received, said speed maintaining mechanism further including a pressure actuated motor differentially responsive to said pressure output and one of said two different pressure inputs and connected with said variable speed unit to maintain the actual unit speed at the selected desired unit speed put into said means.

3. A vehicle road speed warning system for a vehicle having an engine and driver operated engine speed control means for controlling the speed of the engine and thereby the speed of the vehicle, said system comprising a motor for forcibly resisting driver movement of said engine speed control means toward the increasing engine speed direction when a desired vehicle road speed is attained, a spring urging said engine speed control means toward the decreasing engine speed direction, means for sensing actual vehicle road speed and comparing that speed with a selected desired vehicle road speed and developing a continuous vehicle road speed error signal, and a proportional control mechanism connected with said motor and said sensing means for continuously controlling said motor in accordance with said speed error signal within a proportional speed error range having limits greater than minimum vehicle speed and less than maximum vehicle speed and substantially centered on the selected desired vehicle speed to actuate said motor whereby said motor warns the vehicle operator of the attainment of the desired vehicle speed by forcibly resisting further movement of said engine speed control means in the increasing engine speed direction, the resisting force of said motor increasing under influence of said speed error signal when the actual vehicle speed increases beyond the selected desired vehicle speed in proportion to speed error within the proportional speed error range and remaining constant when the actual vehicle speed passes beyond the porportional speed error range.

(References on following page)

References Cited in the file of this patent

UNITED STATES PATENTS

| | | |
|---|---|---|
| 1,990,354 | Sylvester et al. | Feb. 5, 1935 |
| 2,146,304 | Lee | Feb. 7, 1939 |
| 2,169,268 | McCullough | Aug. 15, 1939 |
| 2,222,141 | Denison | Nov. 19, 1940 |
| 2,314,570 | Ball | Mar. 23, 1943 |
| 2,469,505 | Keefer | May 10, 1949 |
| 2,661,764 | Johnson et al. | Dec. 8, 1953 |
| 2,671,542 | Robnett | Mar. 9, 1954 |
| 2,708,979 | Reynoldson | May 24, 1955 |
| 2,714,880 | Riley | Aug. 9, 1955 |
| 2,815,041 | Rimsha et al. | Dec. 3, 1957 |
| 2,822,881 | Treharne | Feb. 11, 1958 |
| 2,913,545 | Bordinat et al. | Nov. 17, 1959 |
| 2,966,224 | Teetor | Dec. 27, 1960 |